Figure 1:
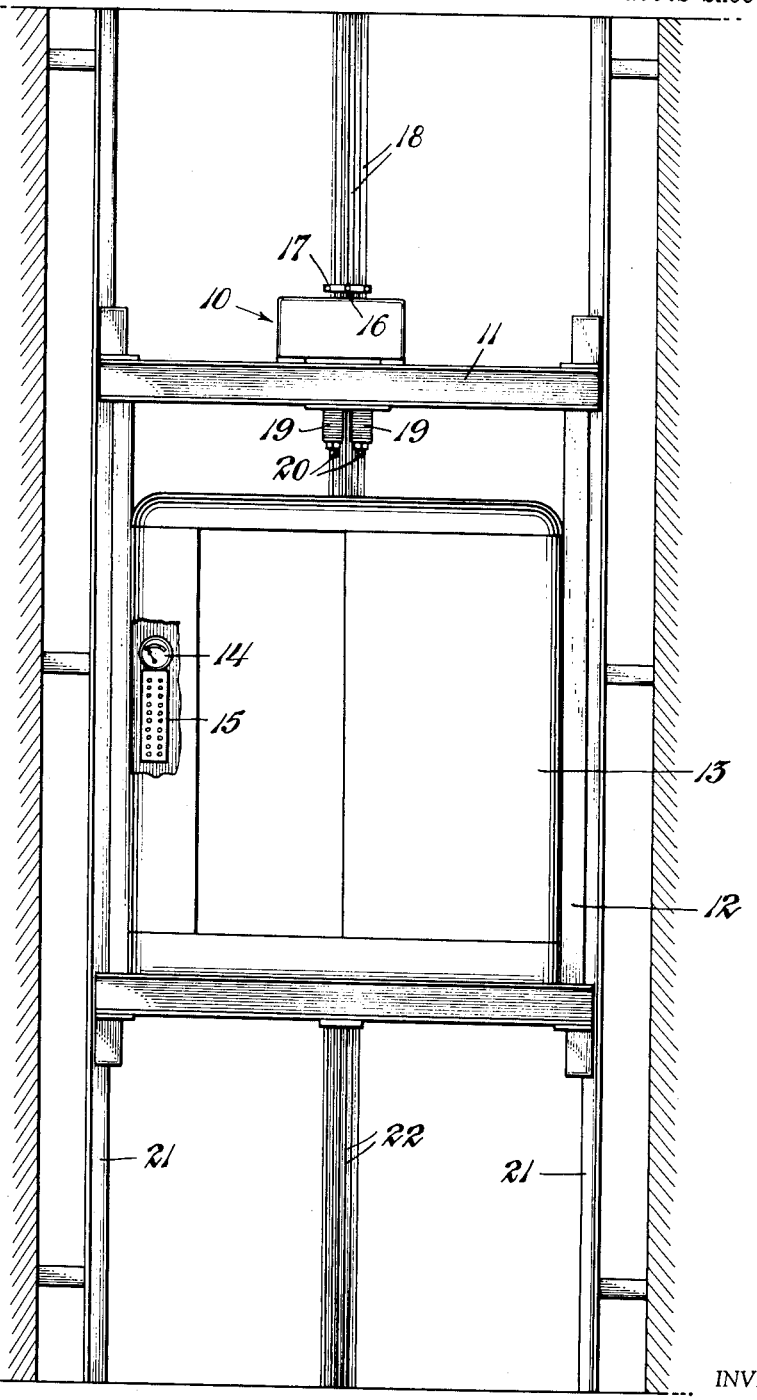

June 26, 1956 — W. DOOLAN — 2,752,007
ELEVATOR OVERLOAD INDICATOR AND SAFETY DEVICE
Filed Aug. 19, 1955

INVENTOR
William Doolan,
BY Walter S. Pawl.
ATTORNEY

June 26, 1956 W. DOOLAN 2,752,007
ELEVATOR OVERLOAD INDICATOR AND SAFETY DEVICE
Filed Aug. 19, 1955 4 Sheets-Sheet 2

INVENTOR
William Doolan,
BY Walter S. Paul.
ATTORNEY

June 26, 1956  W. DOOLAN  2,752,007
ELEVATOR OVERLOAD INDICATOR AND SAFETY DEVICE
Filed Aug. 19, 1955  4 Sheets-Sheet 3

INVENTOR
William Doolan,
BY Walter S. Paul.
ATTORNEY

June 26, 1956

W. DOOLAN 2,752,007

ELEVATOR OVERLOAD INDICATOR AND SAFETY DEVICE

Filed Aug. 19, 1955

4 Sheets-Sheet 4

INVENTOR
William Doolan,

BY Walter S. Paul

ATTORNEY

United States Patent Office 2,752,007
Patented June 26, 1956

2,752,007

ELEVATOR OVERLOAD INDICATOR AND SAFETY DEVICE

William Doolan, Washington, D. C.

Application August 19, 1955, Serial No. 529,544

9 Claims. (Cl. 187—29)

This invention relates to improvements in overload safety devices and load indicators for elevators. While it is adaptable particularly for such overload safety devices and load indicators as are disclosed in my prior patents, Nos. 2,644,546, issued July 7, 1953 for Safety Mechanism or Control for Elevators, and 2,644,547, issued the same day for Elevator Overload Safety Device, it is equally adaptable for any other safety controls and load indicators for elevators which have cages suspended on resilient cushioning means, and the cage tare load of which may vary from floor to floor.

What is meant by the tare load is the weight hung on the cage suspension means when the cage is empty of any useful load.

Elevator systems using compensating chains or the like hung to the bottom of the cage, produce a variable tare weight on the suspension cables at different floor levels. This variation may be very sizable in very tall elevator shafts using cages having heavy compensating chains or cables attached thereto and hanging freely thereunder. When the cage is at the top of the shaft, the cage inherently supports a maximum length of the chain or cable hanging below it, whereas a minimum length is supported when the cage is at the bottom of the shaft. The maximum length may weigh several hundred pounds, especially in tall buildings.

In any event, with present day load safety devices, a cage with a safe load at the ground or lower floors might have to have some of its load removed at some intermediate floor, where it might be stopped by an up call, instead of picking up a passenger, before the safety circuit would permit a continued run to higher floors, because of an added length of compensating chain or cable causing an overload. Thus, if the overload control is adjusted for overload at a higher level, where the tare load is high, it may not register an actual overload at lower floors; and if the control is properly adjusted for overload at a lower level, where the tare load is less, it will register a less-than-permissible load as an overload at higher floors.

In order to obviate such predicaments and cause the overload safety circuit to be responsive only to the useful load at all floors, it is necessary to take into account the variation in the tare load of the cage suspension cables at different floor levels in this type of elevator systems, and compensate for such variation.

The main object of this invention is to provide an improved overload safety cutoff device and indicator in elevator cages which will cumulatively respond only to the useful load placed in the cage, and will compensate in its operation for any externally added load to the cage suspension so as not to register such load or affect the operation of the safety device thereby.

A further object is to provide a safety switch operating device responsive to the aggregate amount of relative movement between the cage and its suspension cables due to load increments moved into or out of the cage, but which will not be affected by any amount of such relative movement when the cage gate is closed, due to any change in the external or tare loading of the cage.

A further object is to provide a safety switch operating mechanism including a movable switch control element and means to by-pass call signals when the cage has substantially a full capacity load.

Obviously, this overload safety control and load indicator device is broadly applicable to any elevator system regardless of the source of power for either the device or the operation of the elevator, the object being broadly to provide an overload safety power cutoff and load indicator device which cumulatively responds to the load placed in the elevator cage independently of any intervening change in the tare load.

A further object is to mount this device on the rigid structure of the cage and connect its power cut-off means and load indicator control element to the cage suspension cables through a lost motion mechanism, said lost motion being provided by a declutching means in said connection operative in response to closure of the cage gate, so that any relative motion between the cage and the suspension cables due to inertia, or change in external loading at different levels, will not move the power cut-off means and load indicator control element.

A further object is to apply this device to elevators having reduced speeds of operation for higher loads, to switch the elevator operation from one speed to another at a predetermined load before the maximum load at the lower speed is reached.

A further object is to add a further control switch in the above device for bypassing calls at any floors when the cage already has substantially a capacity load.

Figure 2:
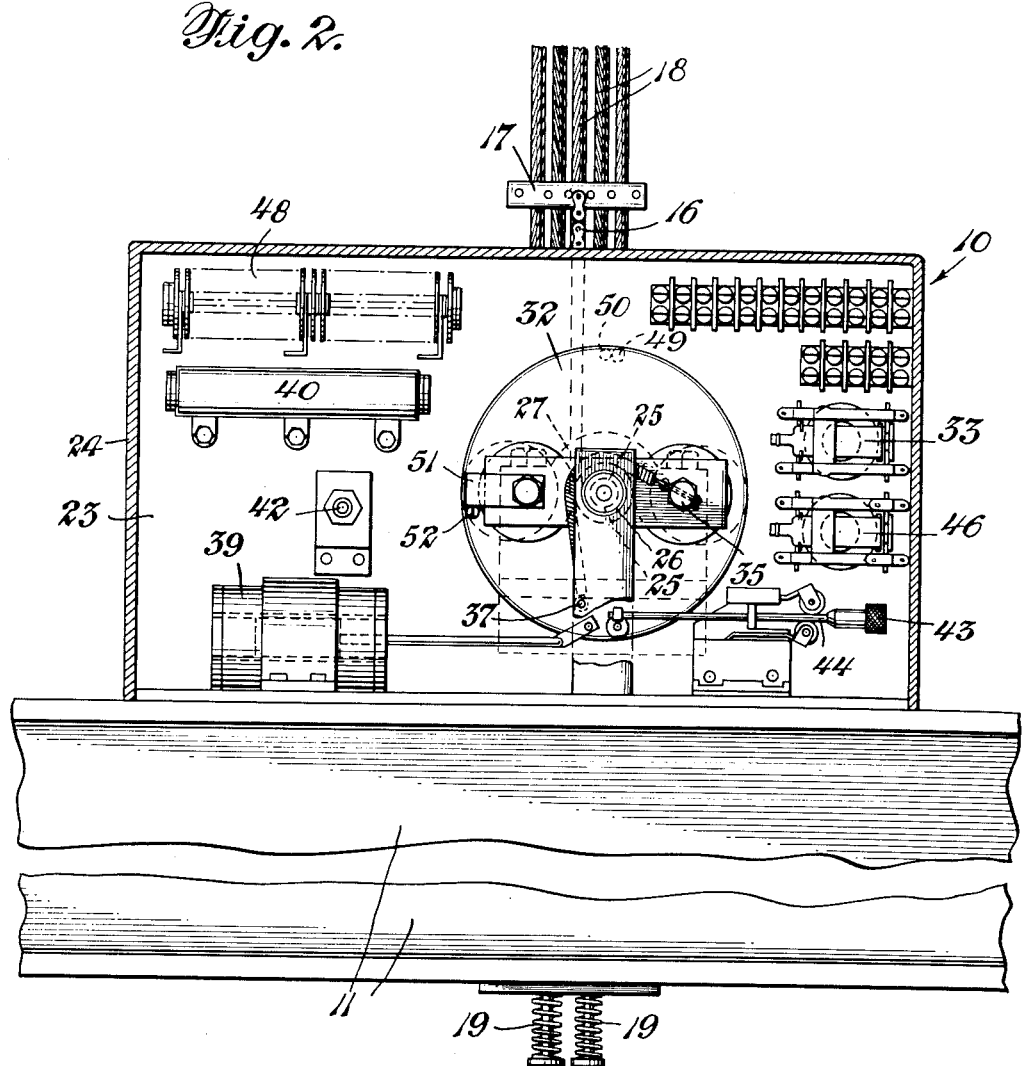
Figure 3:
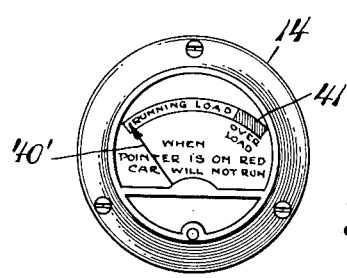
Figure 4:
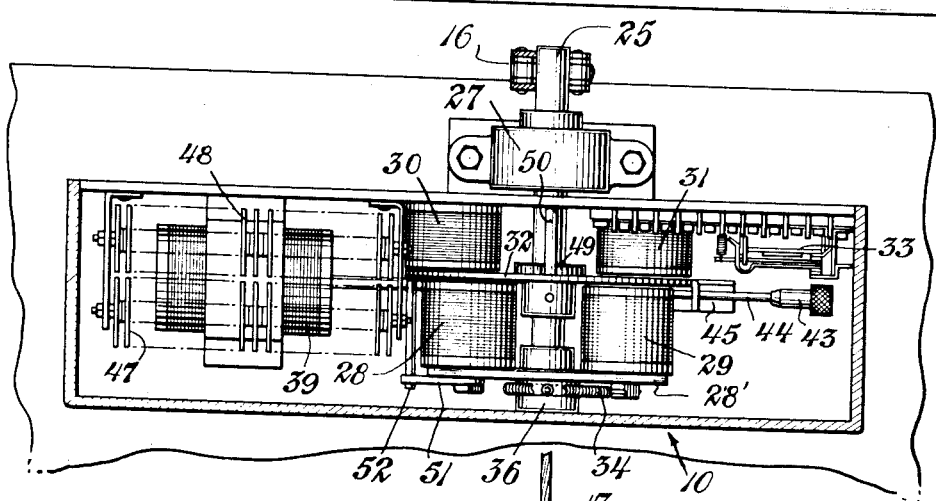
Figure 5:
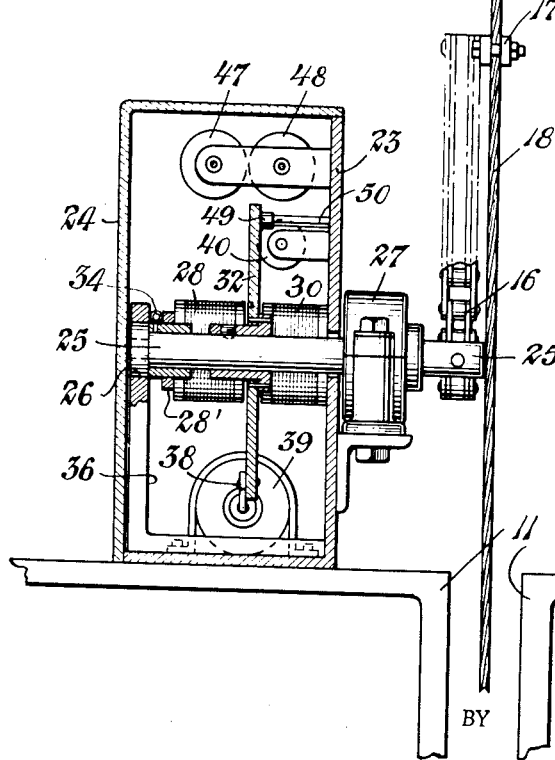
Figure 6:
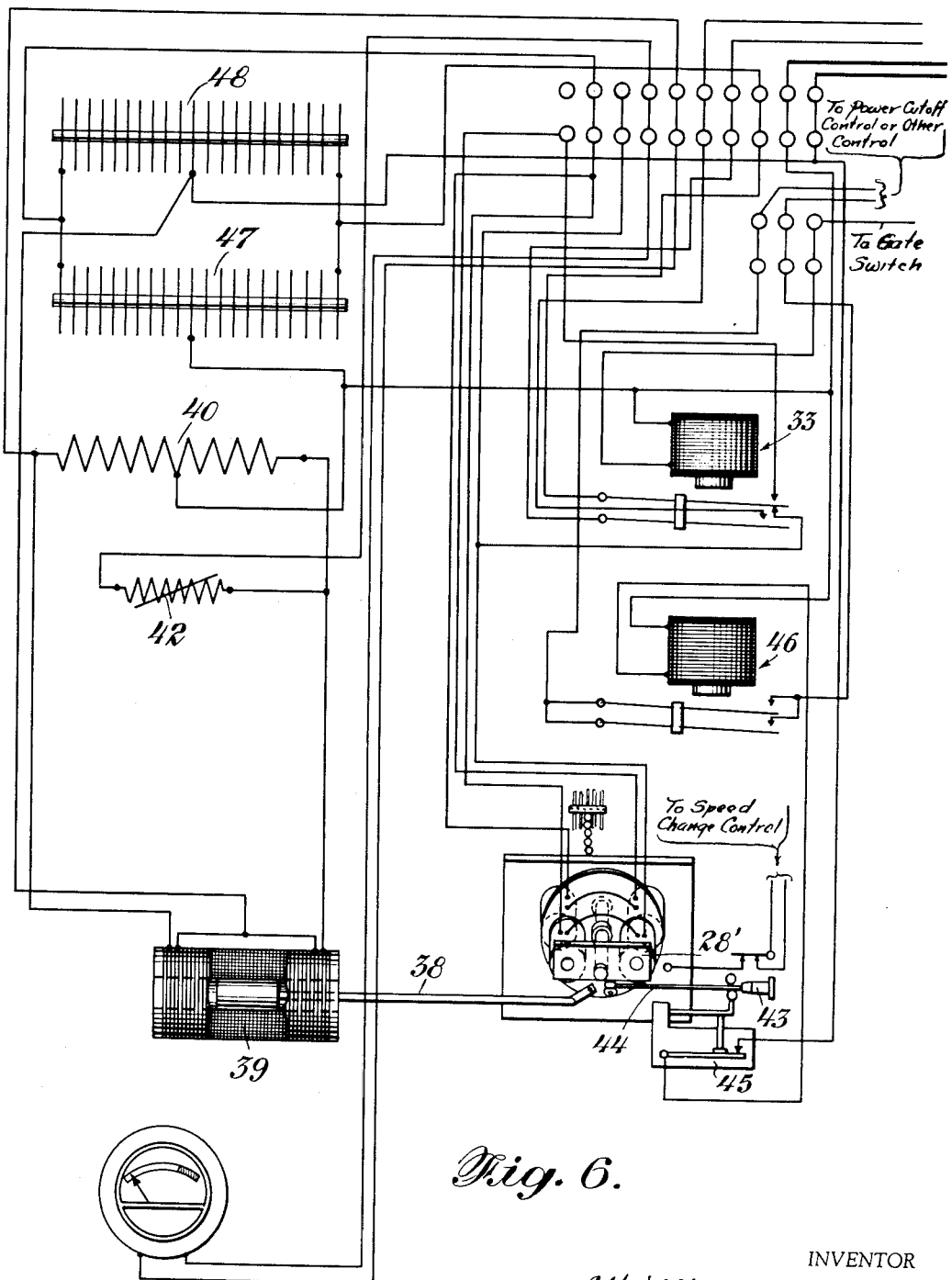

Other and more specific objects will become apparent in the following detailed description of the invention and the accompanying drawings, wherein:

Fig. 1 illustrates how the device of the present invention may be applied to one form of conventional elevator cages, Fig. 2 is an enlarged elevational view of the box containing the major portion of the device with the front cover removed, Fig. 3 is an enlarged view of the indicator which may be used in this device, Figs. 4 and 5 are sectional plan and end views respectively of the box portion, and Fig. 6 is a schematic wiring diagram that may be used to carry out the operation of the several parts of the present device in accordance with the invention.

In present day elevator systems, the conventional frame or cradle which supports the cage is suspended on cables which run up to the top of the elevator shaft and are then taken up by some form of winch, usually operated by an electric motor and brake means to move and stop the elevator cage. Usually, these cables are passed over pulleys to a counterweight which travels up and down in opposite direction to that of the elevator cage. This obviously relieves the motor of some work, in that the tare weight hung on both sides of the pulleys is substantially balanced at all times and only the weight of the useful load in the cage has to be overcome in controlling the operation of the elevator.

The specific form of the device here illustrated is not necessarily the best in detail construction and relation of parts for all applications, but is intended merely to illustrate one way in which the invention may be carried out for a specific arrangement of cage suspension means.

As shown in Fig. 1, the present device 10 may be mounted on the upper beams 11 of the frame or cradle 12 supporting the cage 13, in which the indicator 14 controlled by device 10 may be mounted in a suitable place on the wall near the elevator control panel 15.

The movable element of device 10, in the present instance the chain 16, is fixed at its upper end to bracket 17 fixed to the suspension cables 18. Compression springs 19 act as cushioning means in the suspension between the beam 11 and the ends 20 of the cables 18. Guide rails 21 guide the frame or cradle 12 in the shaft of the elevator. The elevator illustrated here has a counterbalance system (not shown), with the bottom of the counterweights connected to the bottom of the cage frame 12 by cables 22 of substantially the same linear weight as cables 18, so as to maintain a continuous normal balance in the system on the cage side and the counterbalance side of the pulleys at the top of the elevator shaft.

As may be seen in Figs. 2, 4 and 5, the device may be enclosed in a box 23 having a removable cover 24 for inspection and adjustments of the mechanism inside. A shaft 25 extends through the rear wall of box 23 and is rotatably mounted in bearings 26 and 27. A cross bar 28' is fixed to shaft 25 and carries a pair of solenoids 28 and 29 on opposite sides of the shaft. A second pair of solenoids 30 and 31 is fixed to the back of the box, and a disc of magnetic material 32 is freely rotatably mounted on shaft 25 between the pole pieces of the two pairs of solenoids with a small clearance, so as to form a magnetic clutch selectively with either pair of solenoids when they are energized, to attract the plate toward them, by the relay 33 which normally energizes the movable pair of solenoids 28 and 29 when the cage is open.

Whenever the cage gate is closed relay 33 switches the current from the movable pair of solenoids 28 and 29 to the stationary solenoids 30 and 31 and holds the disc against rotation until the cage gate is again opened for loading or unloading, thus rotating the disc cumulatively in one direction or another in accordance with the change in the useful load in the cage only. The chain 16 is passed around the rear end of shaft 25 and its end is fixed thereto, so that every change in load, whether useful or tare, causes the shaft to turn a proportionate angle clockwise when increased and counterclockwise when decreased, in the manner of a spring scale. The shaft 25 is normally biased to return to its minimum loading position by a return spring 34 having one end fixed to the cross bar at 35 and its other end to the bearing support 36 at 37.

The disc 32 near its periphery may be pivotally connected by rod 38 to a slidable core in the coils 39 which form two legs of a bridge circuit having resistances 40 for its other two legs. The indicator is connected across this bridge and is set to read zero load as shown in Fig. 3, when the core is in its extreme position to the right as viewed in Fig. 2, at which time the bridge circuit is substantially balanced.

As the core is moved to the left within the coils 39 by rotation of disc 32 clockwise with the addition of load in the cage, the bridge circuit unbalance is increased and the amount of this unbalance is indicated on the indicator by the pointer 40' moving to the right on the scale until it reaches the overload range 41 on the scale, which is colored red, when the cage is overloaded.

The sensitivity of the bridge circuit may be adjusted for any permissible load in a particular cage by placing such load in the cage and adjusting a resistance control knob 42 in the bridge circuit, until the needle pointer 40' moves to the entering edge of the overload range on the scale. At the same time the cam screw 43 on rod 44, also pivotally connected to the disc 32, may be adjusted to actuate the micro-switch 45 to operate the relay switch 46 for breaking the power circuit to the elevator controls, for disabling the elevator operation, whenever the useful load exceeds the permissible load in the cage.

One or more additional cam screws may be adjustably threaded along the rod 44 for actuating other micro-switches at desired loads to operate other control circuits; or the other micro-switches may be spaced angularly from micro-switch 45 about the rod 44, and mounted for axial adjustment with respect to the rod, to be actuated by the same cam screw 43 at the desired loads. For instance, if it be desired, one such switch may be adjusted to operate a change-over switch in two-speed elevators, to automatically switch over to a lower speed and greater carrying capacity when the normal load with the higher speed is exceeded on the elevator platform. Or, such micro-switch might be used to operate an automatic by-pass control to by-pass calls at any floor when the load in the cage is substantially close to the permissible limit so that no additional load could be accommodated. Other functions may be similarly controlled at suitable loadings.

The rectifier units 47 and 48 are supplied with the standard A. C. current and are tapped off to provide suitable D. C. voltages for energizing the relay switches 33 and 46, the coils 39, and solenoids 28, 29, 30 and 31.

When the device is disconnected, neither pair of the solenoids is energized and the disc 32 is biased to its no load position with its lug 49 stopped against pin 50 mounted on the rear wall of box 23, by the spring 34 biasing the shaft 25 with its cross bar 28' and extended lever 51 pressing against stud 52 on the disc in a counterclockwise direction. The device should be connected up when the parts are in this initial position and the cage has its minimum load. Chain 16 should be made just taut under these conditions, so that the slightest load addition will immediately start turning the shaft.

As soon as the device is plugged in or switched on, relay 33 will cause the disc 32 to be attracted by, or clutched to, the movable solenoids and the shaft, if the cage gate is opened, so as to register any load added in the cage on the indicator and operate the cam rod 44 accordingly. If the cage gate is closed, relay 33 will switch the energizing current to the stationary solenoids to hold the disc 32 and indicator and rod 44 unaffected by any change in the tare load, but will permit the shaft 25 and movable solenoids to move freely in accordance with such change. Thus, only the changes in the useful load will be registered cumulatively on the indicator and will affect the movement of cam rod 44 to operate the micro-switch or switches at suitable loadings, as may be desired, to perform required control functions depending on the useful loading, independently of any intervening changes in the tare load or of any inertia effects due to starting or stopping the elevator.

Many obvious modifications in the form and arrangement of the several elements comprising this device may be made without departing from the spirit and scope of this invention, as defined in the appended claims.

What is claimed is:

1. In a power cut-off and load indicator system for an elevator cage suspended on cables by resilient means, a power cut-off control mounted on top of said cage, operating means for said control, an element fixed to said cables, clutch means responsive to stopping of said cage for cumulatively transmitting motion from said element to said operating means in accordance with the loading of said resilient means.

2. The combination defined in claim 1, a load indicator control connected to said operating means for causing the load indicator to show the measure of said loading, and brake means for holding said operating means stationary when said clutch means is not operative, so that any changes in said loading due to change in tare load or to inertia during operation of said cage will not be registered on the indicator nor will affect the power cut-off control.

3. The combination defined in claim 2, said operating means being adjustable to operate the power cut-off control at any desired overload, and said load indicator control being adjustable to indicate the same overload range.

4. The combination defined in claim 3, and a by-pass control operative by said operating control to by-pass any calls at floors when the cage is substantially fully loaded.

5. The combination defined in claim 3, and a speed reducing circuit control operative by said operating means in response to a predetermined load in two-speed elevators before the maximum permissible load at low speed is reached.

6. The combination defined in claim 3, and a plurality of circuit controls operative by said operating means at predetermined successively higher loads within the permissible load range.

7. The combination defined in claim 2, said clutch means and brake means being of the electro-magnetic type.

8. In an elevator safety control system having a safety cut-off switch operated by relative movement between an elevator cage and its support means due to a change in loading of the cage, means for transmitting said movement to said safety cut-off switch, including a lost motion mechanism for preventing that portion of the movement being transmitted to the switch, which is caused by any changes in external loading on said elevator cage while the cage is in motion, such as may be caused by a difference in the length of a compensating chain or cable that is supported by said cage at different levels of the cage in its shaft.

9. In an elevator overload safety control and load indicating and overload warning system, a cut-off switch mounted on an elevator cage cradle or frame, movable control means for said switch having a range of movement including a position at which the switch is turned on and cut off in opposite directions, lost motion linkage between said control means and the support means for said cradle or frame, for moving said control means cumulatively in response to changes in loading the cage while the cage gate is open, and for providing lost motion and holding said control means stationary while the cage gate is closed and relative movement between the cage frame and its support occurs due to inertia or a change in external loading on said cage such as caused by a change in the length of compensating chain or cable which may be hanging under the cage at different floor levels, a load indicating and overload warning device in said cage, said control means being also operatively connected to control said device to indicate the loading on a scale through a range of overload, colored to emphasize the warning.

No references cited.